United States Patent [19]
Olschewski et al.

[11] Patent Number: 4,637,806
[45] Date of Patent: Jan. 20, 1987

[54] ARRANGEMENT FOR MOUNTING SWIVEL PIN BEARING IN YOKE OF UNIVERSAL JOINT

[75] Inventors: Armin Olschewski, Schweinfurt; Bernhard Bauer, Hassfurt; Elisabeth Zirk, Dittelbrunn, all of Fed. Rep. of Germany

[73] Assignee: SKF GmbH, Schweinfurt, Fed. Rep. of Germany

[21] Appl. No.: 711,068

[22] Filed: Mar. 12, 1985

[30] Foreign Application Priority Data

Mar. 13, 1984 [DE] Fed. Rep. of Germany ....... 3409078

[51] Int. Cl.[4] .............................................. F16D 3/40
[52] U.S. Cl. .................................... 464/130; 384/559; 384/585
[58] Field of Search ............... 384/559, 564, 584, 585; 464/128, 129, 130, 132

[56] References Cited

U.S. PATENT DOCUMENTS

| | | | |
|---|---|---|---|
| 2,190,041 | 2/1940 | Padgett | 464/128 X |
| 3,005,324 | 10/1961 | Zeller | 464/130 |
| 3,070,980 | 1/1963 | Slaght | 464/128 X |
| 3,204,428 | 9/1965 | Stokely | 464/130 |
| 3,492,710 | 2/1970 | Pitner | 464/130 X |
| 3,552,811 | 1/1971 | Kayser | 464/130 X |
| 3,581,524 | 6/1971 | Pitner | 464/128 X |
| 4,103,512 | 8/1978 | McElwain et al. | 464/130 X |

Primary Examiner—Stuart S. Levy
Assistant Examiner—Daniel P. Stodola
Attorney, Agent, or Firm—Rosen, Dainow & Jacobs

[57] ABSTRACT

A swivel pin bearing for rotatably seating a swivel pin in the yoke eye of a yoke arm. The bearing includes a bushing having a base portion and a sleeve portion integrally formed with the periphery of the base portion, this sleeve portion being arranged in the yoke eye with radial seating play, and a support plate releasably secured to the yoke arm. The base portion has a planar outer surface which opposes a planar inner surface of the support plate. An element is provided for coupling the bushing to the support plate such that axial displacement of the bushing relative to the support plate is prevented. The bushing is capable of sliding radial displacement relative to the support plate which is greater than the radial seating play of the bushing in the yoke eye.

6 Claims, 4 Drawing Figures

ARRANGEMENT FOR MOUNTING SWIVEL PIN BEARING IN YOKE OF UNIVERSAL JOINT

FIELD OF THE INVENTION

The invention relates to a swivel pin bearing for use with the yoke arm of a yoke joint in a universal coupling.

BACKGROUND OF THE INVENTION

A swivel pin bearing of the above-described type is disclosed in U.S. Pat. No. 2,190,041, wherein the bushing is installed in the yoke arm in the yoke joint of a universal coupling and cylindrical rolling elements circulate between the bushing and the outer surface of the swivel pin, whereby the radial loads from the swivel pin are transmitted to the yoke joint by way of the bushing. The swivel pin bearings of the foregoing type all have a bushing which is inserted in the yoke eye with radial seating play, in which case it is possible to retain the original magnitude of the bearing play provided in the bushing, and moreover to avoid a tighter bearing seat with seating pressures, but if the bushing with its reinforced base portion is inserted in the yoke eye in an unfavorable way, the barrel shape of the bushing can be deformed. On account of the seating play, the bushing can be inserted into and removed from the yoke eye with relatively small applications of force. A particular disadvantage of the known swivel pin bearings lies in the fact that in order to disassemble the bushing, first the support plate must be detached and subsequently the bushing must be withdrawn by means of a mounting or tapping tool. As a result of this withdrawal of the bushing, particularly when the bushing is made of delicate thin-walled steel plate, the bushing can be easily damaged. For that reason in the known swivel pin bearings it is not possible to dismantle or replace the bushing in situ without the exercise of skill.

SUMMARY OF THE INVENTION

The object of the present invention is to provide a swivel pin bearing of the known type in which the bushing can be inserted and withdrawn together with the support plate despite the radial bearing play of the bearing bushing in the yoke eye. As a result of this manner of inserting and withdrawing the bushing, the use of bushing-handling mounting tools is rendered unnecessary.

In accordance with the swivel pin bearing of the present invention, the bushing in its ready-for-use installed condition is provided with a holding element, which connects the bushing to the support plate to form a finished constructional unit. The arrangement according to the invention allows for a sliding radial displacement of the pin-loaded base portion of the bushing with respect to the inner surface of the support plate, the size of this displacement conforming to the radial seating play of the sleeve portion in the yoke eye. By means of this sliding displacement of the base portion, the bearing bushing is conveyed on the inner surface of the support plate in the radial direction, so that no oblique setting of the bushing in the yoke arm occurs. This ensures that the sleeve portion of the bushing, which transmits the radial bearing load to the yoke arm, is always in contact along its entire load-carrying length with the surrounding wall of the yoke eye. Also, damaging edge loads of the sleeve portion, which would normally arise as a result of the oblique setting of the bushing, are prevented. The holding element needs no radial impact or bearing forces to be transmitted thereto and is consequently safeguarded against material fatigue due to overload and against fracture during operation.

During the insertion of the bushing in accordance with the present invention, only the support plate need be handled in order to install the bushing in the yoke eye. During withdrawal of the bushing, the support plate can be withdrawn from the yoke arm together with the bushing, again with only the support plate being handled. Accordingly it is not necessary to handle or grasp the bushing with a mounting tool during either insertion or withdrawal, so that mounting and dismounting can take place at the site of operation without the performance of further steps.

In accordance with a preferred embodiment of the invention, a holding element is formed in an economical manner by welding or molding projections on the base portion of the bearing bushing and/or on the support plate.

According to a further preferred embodiment, a body is provided as the holding element which is made of corrosion-resistant material, for example, rubber or synthetic elastomer.

In another embodiment of the present invention, the holding body may be rigidly connected to the rounded rim of the base portion of the bushing by vulcanization, the profile of the base portion being such that the outer periphery has only rounded edges. This holding body prevents the admission of moisture and/or foreign bodies, dust or the like from outside into the region between the inner surface of the support plate and the outer surface of the base portion, thereby preventing damage to the surfaces arising from the friction generated by their rubbing together with foreign bodies therebetween.

In each of the above-described embodiments the support plate is releasably secured to the yoke arm by means of bolts. According to the present invention, the bushing can be withdrawn from the yoke eye together with the support plate without the use of mounting or tapping tools. In particular, the bolts are unscrewed, thereby disconnecting the support plate from the yoke arm, and then the bolts are screwed into additional holes formed in the support plate, which holes are opposed by the end surface of the yoke arm. As the bolts are axially displaced during screwing into these additional holes, the tips of the bolts come into contact with the end surface of the yoke arm, thereby pushing the support plate with the bushing connected thereto away from the end surface, as a result of which the bushing is withdrawn from the yoke eye.

In a further embodiment, either the inner surface of the support plate or the outer surface of the base portion of the bushing can be provided with a wear-resistant coating if high axial forces are transmitted between the opposing relatively sliding surfaces.

BRIEF DESCRIPTION OF THE DRAWINGS

The swivel pin bearing according to the present invention is described in detail with reference to the following drawings.

DETAILED DESCRIPTION OF THE PREFERRED EMBODIMENTS

Figure 1:
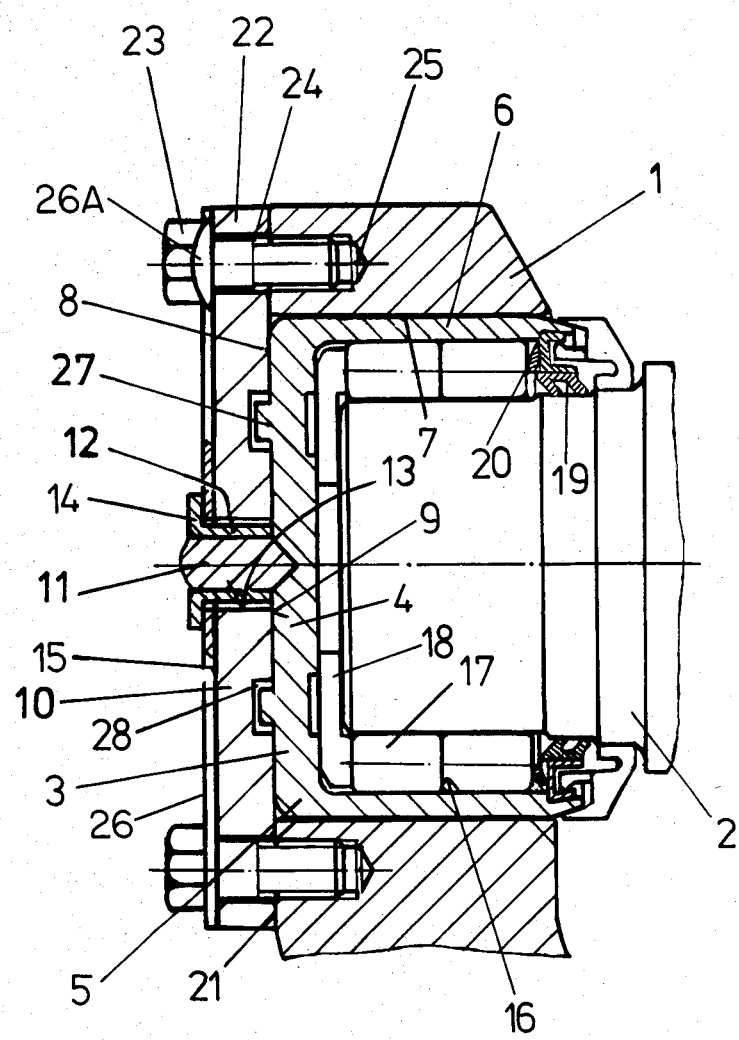
FIG. 1 shows a longitudinal section of a swivel pin bearing in which a central projection is rigidly connected to the base portion of the bearing bushing by welding.
Figure 2:
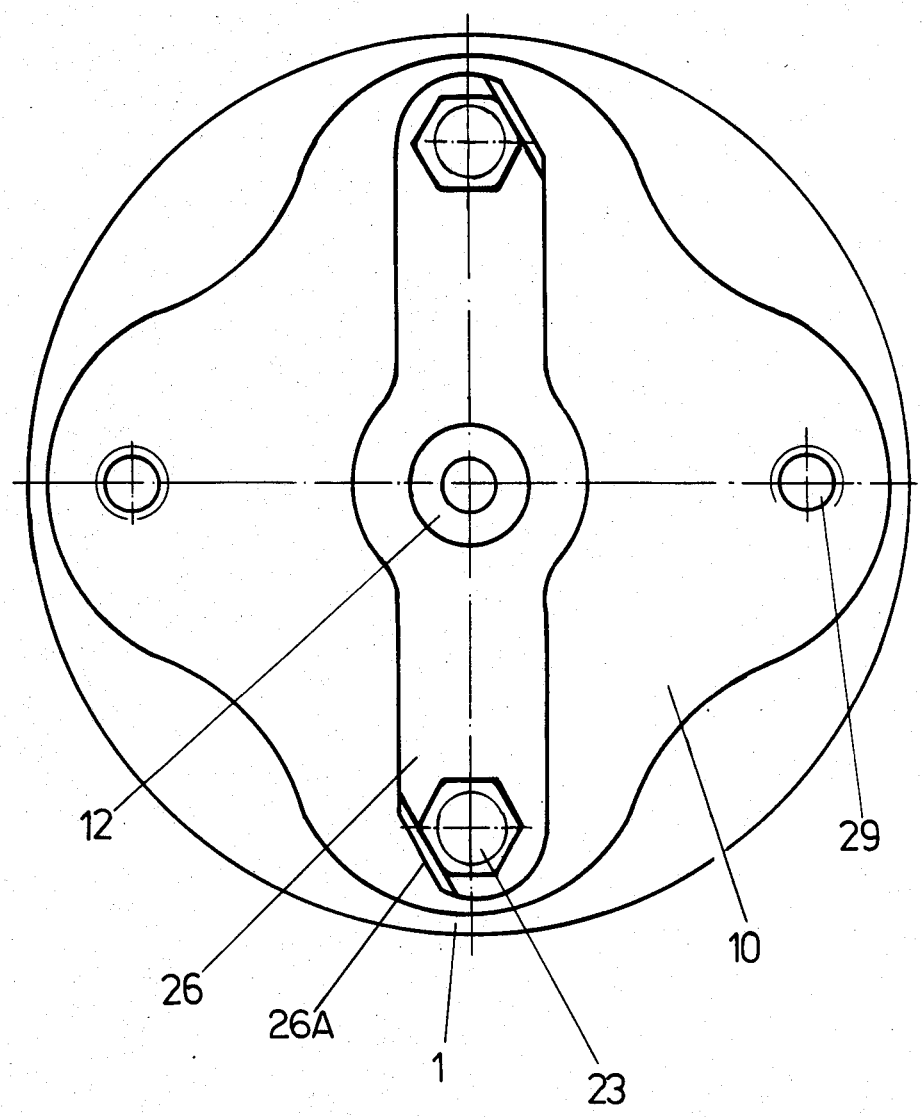
FIG. 2 shows a frontal view of the swivel pin bearing depicted in FIG. 1.

The numeral 1 in FIGS. 1 and 2 denotes the yoke arm of a yoke type joint of a universal coupling (not shown). The swivel pin 2 of the crosspiece (not shown) is rotatably supported in a bearing bushing 3 comprising a base portion 4 and a sleeve portion 6 integrally connected to the outer periphery 5 of base portion 4. The sleeve portion 6 is radially supported in a cylindrical yoke eye 7 of the yoke arm 1 with radial play. The base portion 4 is provided with a radially extending planar outer surface 8, which is coated with a friction-reducing material, for example, a layer of molybdenum disulfide or polytetrafluorethylene. The outer surface 8 is supported against the opposing planar inner surface 9 of a support plate 10 which is releasably secured to the yoke arm 1.

The base portion 4 of bushing 3 carries as a holding element a projection in the form of a flanged sleeve 12 projecting from the outer surface 8 and connected to the base portion 4 by means of welded material 11. The flanged sleeve 12 extends through a central axial orifice 13 formed in the support plate 10 and is arranged with radial play with respect to the wall of orifice 13 when the bushing 3 is in the installed position, which play is greater than the seating play of the sleeve portion 6 arranged in the yoke eye 7. The flanged sleeve 12 has a flange-forming thickened portion 14 on its outer end, the undersurface of which directly overlies the outer surface 15 of the support plate 10 adjacent the orifice 13.

In the foregoing case, two rows of cylindrical rolling elements 17 roll between the outer surface of swivel pin 2 and the bore surface 16 of bushing 3. These rolling elements 17 transmit the radial loads from swivel pin 2 to the bushing 3.

A planar annular disc 18 made of friction-reducing plastic is seated in the bushing 3 between the planar end surface of swivel pin 2 and the planar inner surface of base portion 4 of bushing 3. This disc 18, which abuts the end surface of swivel pin 2, also abuts the opposing end surfaces of the outer row of rolling elements 17 and supports these end surfaces axially outwardly.

In the axially inwardly directed open end of sleeve portion 6 of bushing 3, a sealing ring 19 is fixed in the bore of bushing 3. This sealing ring 19 slides with sealing side slip on the outer surface of swivel pin 2. A cup spring 20 is inserted between the sealing ring 19 and the end surfaces of the axially adjacent row of rolling elements 17. Cup spring 20 urges the rolling elements 17 against the disc 18 in an elastic manner and consequently these elements are positioned free of play in the axial direction.

The support plate 10 has a peripheral portion 22 which extends radially beyond the yoke eye 7 of yoke arm 1 and which abuts a planar lateral contact end surface 21 of yoke arm 1. Peripheral portion 22 is releasably secured to contact surface 21 by means of two diametrically opposed bolts 23.

The bolts 23 each pass through and engage a respective axial throughgoing hole 24 in peripheral portion 22 and are screwed into the respective threaded hole 25 extending into the yoke arm 1 from the contact surface 21, so that the head of each bolt 23 tightly presses the peripheral portion 22 against the contact surface 21. A locking plate 26 is securely arranged between the heads of the tightened bolts 23 and the front surface 15 of support plate 10. The locking plate has bent portions 26A which each abut one facet of a respective bolt head, whereby the bolts 23 are secured against unscrewing and loosening.

Two punctiform projections 27 are formed at diametrally opposite positions on the periphery of outer surface 8 of base portion 4. Each of the two projections extends with radial play into an opposing recess 28 formed on inner surface 9 of support plate 10, thereby preventing rotation of bushing 3 relative to yoke eye 7. The radial play between projections 27 and respective recesses 28 is greater than the seating play of sleeve portion 6 in yoke eye 7.

As can be seen in FIG. 2, the support plate 10 has two axially throughgoing threaded holes 29 formed therein, which holes are axially opposed by the contact surface 21 of yoke arm 1.

The bushing 3 is connected to the support plate 10 by means of the welded flanged sleeve 12 (see FIG. 1). The bushing can be axially inserted in the yoke eye 7 until abutment of the support plate 10 against the contact surface 21, the support plate then being releasably fastened to the yoke arm 1 by means of bolts 23.

In accordance with this embodiment, the bushing 3 can be removed by first loosening and unscrewing bolts 23. Then the bolts 23 are screwed into the threaded holes 29 until the ends of the bolts come into contact with contact surface 21 of the yoke arm 1. By further screwing of both bolts 23, whereby the bolts are axially displaced, the support plate 10 is forced away from contact surface 21, which results in the bushing 3 being removed from the yoke eye 7 due to the flanged sleeve 12 connecting the bushing to the displaced support plate 10.

Figure 3:
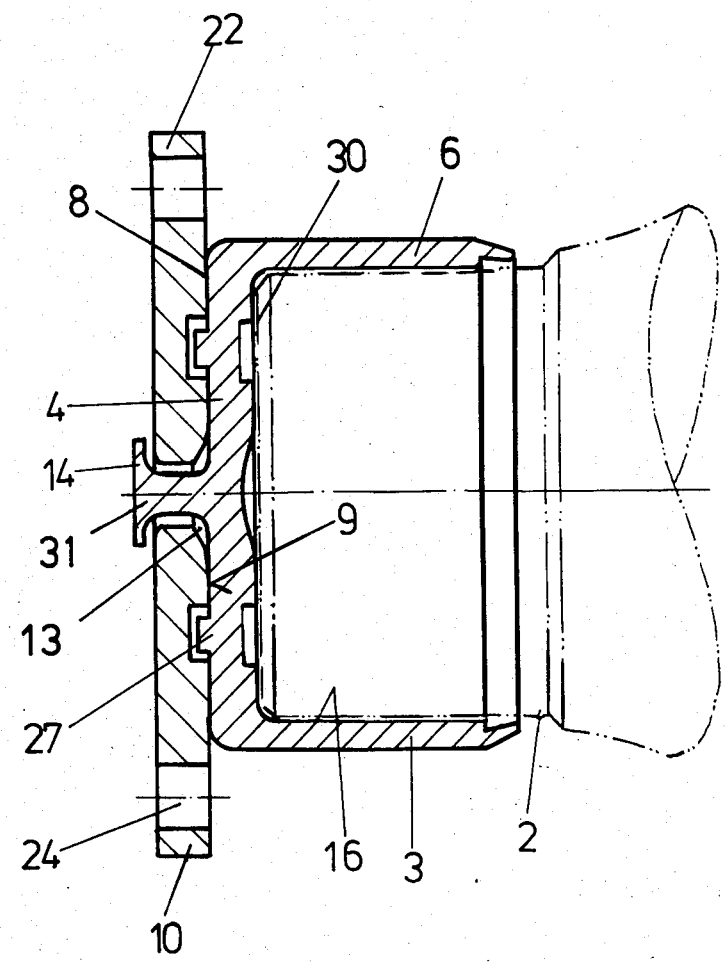
FIG. 3 shows a longitudinal section of a further embodiment of the swivel pin bearing (with the yoke arm not depicted) wherein a central projection is integrally formed with the base portion of the bushing.

In FIG. 3 a modified embodiment of the swivel pin bearing according to the present invention is shown. The swivel pin 2 of this bearing is indicated by the dotted-dashed lines. Swivel pin 2 slides directly on the bore surface 16 of bushing 3, so that bore surface 16 acts as a sliding surface, on which surface the radial loads of swivel pin 2 are exerted.

The end surface of rotating swivel pin 2 slides on the inner surface of base portion 4 of the bushing 3 and is supported on this inner surface. A circular recess is arranged on the periphery of the inner surface. The recess 30 is filled with a friction-reducing material, for example, an oleaginous open-celled plastic foam.

The support plate 10 is bolted to the yoke arm (not shown) in precisely the same manner as in the previously described embodiment whereby bolts (not shown) are respectively inserted in an axial throughgoing hole 24 formed in the peripheral portion 22 of support plate 10.

The projections 27 project into and engage with radial play opposing respective recesses 28 formed in the inner surface 9 of support plate 10. This radial play is sufficiently large to enable sliding radial displacement of bushing 3 relative to support plate 10, and is also greater than the radial seating play of sleeve portion 6 in yoke eye 7. The projections 27 ensure that bushing 3 cannot rotate in the yoke eye of the yoke arm.

In the foregoing embodiment, the holding element is formed by a projection 31 integrally connected to base portion 4 and extending from outer surface 8. This projection 31 has a cylindrical portion which engages axial orifice 13 formed in the support plate 10 with radial play, which play is greater than the seating play of the sleeve portion 6 of bushing 3 in the yoke eye. The projection 31 has a second portion 14 on its outer end, the undersurface of which is in confronting proximity to the outer surface 15 of support plate 10 in the area adjacent to orifice 13. As a result, the projection 31 forms a holding element, whereby sliding radial displacement of outer surface 8 of bushing 3 relative to inner surface 9 of support plate 10 is permitted and moreover whereby the support plate 10 and the bushing 3 are connected for coupled movement in the axial direction.

Figure 4:
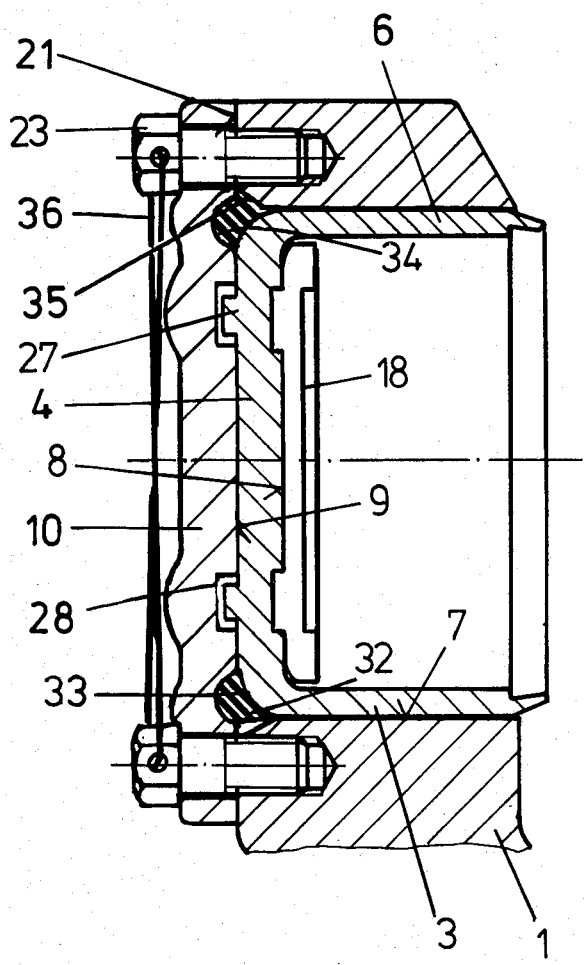
FIG. 4 shows a longitudinal section of a further embodiment of the swivel pin bearing (with the swivel pin not depicted) wherein a ring-shaped body made of rubber or other suitably elastic material is vulcanized onto the radially outer rim of the base portion of the bushing.

In FIG. 4, a further embodiment of the swivel pin bearing of the present invention is shown with the swivel pin not depicted. In this case the holding element is formed by a ring-shaped body 32 which is arranged in an interstitial space between the support plate 10 and the bushing 3. This body 32 is made of rubber, the characteristic elasticity of which enables a sliding displacement of outer surface 8 of base portion 4 with respect to the inner surface 9 of support plate 10.

In the embodiment of FIG. 4 the interstitial space is axially inwardly defined by the radially outwardly directed peripheral edge 33 of base portion 4 which forms a rounded transition surface between the outer surface 8 of base portion 4 and the cylindrical outer surface of sleeve portion 6. The edge 33 has formed on its circumference a convex arched surface which is axially inwardly offset with respect to the adjacent outer surface 8 of base portion 4.

The interstitial space is moreover defined by a recess 34 formed in the inner surface 9 of support plate 10, which engages the ring-shaped body 32 with form-locking. The recess 34 axially opposes the peripheral edge 33 and forms radially inwardly and radially outwardly directed boundaries which limit the radial displacement of body 32. The recess 34 is formed as a concentric annular groove in the inner surface 9 of support plate 10 by molding and without cutting. The cylindrical yoke eye 7 has a conical flaring 35 at its outer end, which forms a free space in the radial direction surrounding the body 32. The material of body 32 can travel into this free space during the loading by shearing action and elastic deformation resulting from the sliding displacement of outer surface 8 of base portion 4 relative to the inner surface 9 of support plate 10.

The bushing 3 is secured against rotation in yoke eye 7 by means of projections 27 formed on the outer surface 8 of base portion 4, which projections engage with radial play the opposing recesses 28 formed in inner surface 9 of support plate 10.

By means of two bolts 23 which are secured against rotation by locking wire 36, the support plate 10 is releasably secured to the contact surface 21 of yoke arm 1.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

For example, the interstitial space between the support plate and the bearing bushing can be formed by a multiplicity of randomly formed recesses in the inner surface of the support plate and/or in the outer surface of the base portion of the bushing. These recesses are then filled by a corresponding multiplicity of bodies made of a material which is sufficiently elastic to enable yielding of the bodies during radial sliding displacement of the outer surface of the base portion of the bushing relative to the inner surface of the support plate.

Also, it is not necessary that the projection which serves as a holding element be arranged on the outer surface of the base portion. In certain cases it is equally expedient if this projection is arranged so that it projects from the inner surface of the support plate. The projection then engages an opposing axial orifice formed in the base portion of the bushing with a radial play that is greater than the seating play of the sleeve portion of the bushing in the yoke eye. On its outer end, the projection carries a thickened portion, the undersurface of which opposes the inner surface of the base portion of the bushing in the area adjacent to the orifice.

Moreover, it is not necessary that the projections serving as holding elements be arranged concentric to the bearing axis on the outer surface of the base portion of the bushing or on the inner surface of the support plate. Furthermore, these projections can be arranged eccentric to the bearing axis, so that rotation of the bushing relative to the yoke eye is prevented. In this case it is also not necessary to form peripherally arranged projections on the outer surface of the base portion, in order to prevent rotation of the bushing relative to the yoke eye.

What is claimed is:

1. In a swivel pin bearing for rotatably seating a swivel pin in a yoke eye of a yoke arm, including a bushing having a base portion and a sleeve portion integrally formed with the periphery of said base portion, said sleeve portion being arranged in said yoke eye with radial seating play and said base portion having a planar outer surface, and a support plate having an inner planar surface arranged to oppose said outer surface of said base portion of said bushing and releasably secured to said yoke arm, the improvement wherein said bearing further includes means for coupling said bushing to said support plate such that axial displacement of said bushing relative to said support plate is substantially prevented and said bushing is capable of a sliding radial displacement relative to said support plate which is greater than said seating play, said coupling means comprising a rigid holding element rigidly connected to said outer surface of said base portion, said support plate having an axial orifice, said holding element comprising an axial portion extending from said outer surface of said base portion and arranged with radial play in said axial orifice and a radial portion rigidly connected to the end of said axial portion, said radial portion of said holding element abutting an outer surface of said support plate in an area adjacent said axial orifice.

2. The swivel pin bearing as defined in claim 1, wherein said support plate has a peripheral portion which extends beyond said yoke eye and contacts a side surface of said yoke arm.

3. The swivel pin bearing as defined in claim 2, wherein said side surface of said yoke arm has a pair of threaded bores formed therein, wherein said peripheral portion of said support plate has a pair of bores formed therein and arranged to respectively align with said threaded bores of said yoke arm when said bushing is arranged in said yoke eye, and wherein said support plate is releasably secured to said yoke arm by means of a pair of bolts each of which is threaded to enable coupling with said respective threaded bore of said yoke arm when said bolt is in arranged said respective aligned bores.

4. The swivel pin bearing as defined in claim 3, wherein said support plate has a second pair of bores formed therein, each of said second pair of bores being threaded to enable coupling with said bolts and being arranged to oppose said side surface of said yoke arm.

5. The swivel pin bearing as defined in claim 1, wherein a friction-reducing coating is arranged between said outer surface of said base portion and said inner surface of said support plate.

6. The swivel pin bearing as defined in claim 5, wherein said friction-reducing material is made of material taken from the group consisting of polytetrafluoroethylene and molybdenum disulfide.

* * * * *